United States Patent Office 2,752,328
Patented June 26, 1956

2,752,328

POLYAMIDES OF TEREPHTHALIC ACID AND DI-AMINES HAVING METHYL SUBSTITUTED HYDROCARBON CHAIN

Eugene Edward Magat, Wilmington, Del., assignor to E. I. du Pont de Nemours and Company, Wilmington, Del., a corporation of Delaware No Drawing. Application February 16, 1952, Serial No. 271,968

13 Claims. (Cl. 260—78)

This invention relates to novel synthetic linear condensation polymers, and is more particularly concerned with fiber-forming polyamides of unusual properties formed by condensing terephthalic acid with alkyl substituted polymethylenediamines.

For most textile uses desirable fiber properties include high strength, low shrinkage and a softening point which is sufficiently high to permit ironing without difficulty. For use as tire cord a fiber must also have a high resistance to deformation at temperatures encountered in service and must retain its strength well until temperatures of at least 200° C. are reached. Resistance to deformation involves such factors as low elongation under stress and absence of permanent deformation or growth after stress is removed. A most important criterion of deformation properties is the tensile modulus or slope of the stress-strain curve of the fiber. This is determined by plotting tensile stress on a vertical axis as a function of elongation on a horizontal axis. Since the curve departs more and more from a straight line as the elongation is increased, the initial tensile modulus, the slope of the reasonably straight first portion of the curve, is used. The initial modulus is the stress in grams per denier, measured at 1% elongation, multiplied by 100. The initial tensile modulus should be as high as possible and preferably over 90.

Previously known useful polyamide fibers, although used to some extent in tire cord, have not realized the potential in this use which was originally thought possible in consideration of their high tensile strengths. Polyhexamethylene adipamide fibers, for example, may be prepared which have high tenacity, low elongation at break and which do not lose 50% of their strength until a temperature of 242° C. is reached, but these fibers are borderline in resistance to inflation growth and the initial tensile modulus is only 40 to 50. Other known aliphatic polyamide fibers have less desirable properties.

Experience with polyethylene-terephthalate, a polyester resulting from condensation of ethylene glycol and terephthalic acid, has shown that introduction of the benzene ring into the linear chain stiffens the polyester fibers to such an extent that initial tensile moduli as high as 140 have been obtained. However, attempts to make corresponding polyamides from polymethylenediamines and terephthalic acid have not yielded useful fibers. All attempts to prepare spinnable polymers based on a diamine having 5 or less carbon atoms in the chain have been unsuccessful; the terephthalamides were either not spinnable or the fibers produced were extremely brittle.

The straight-chain polymethylenediamines which have six to ten carbon atoms in the chain yield terephthalamides of such high melting points that fibers cannot be spun successfully by the melt-spinning methods ordinarily employed for polyamides. At the temperatures of 340° C. or above required to melt down polymers having molecular weights high enough to form strong fibers, the condensation polymerization continues and it becomes increasingly difficult to keep the polymer molten. Steam given off as a result of condensation polymerization and the gases produced by the relatively active decomposition reactions at the temperatures involved cause foaming and result in melt spun fibers which are bubbly and weak. The only known practical solvents for these polyamides require the use of temperatures of the order of 300° C. or higher and are difficult to remove.

Terephthalamides made from polymethylenediamines having more than 10 carbon atoms in the chain do have melting points approaching the range which permits fiber production by the melt-spinning methods ordinarily employed. However, the long polymethylene chain in the diamine part of the molecule gives physical properties to the resulting fibers which are not much different from the well known aliphatic polyamides, e. g., polyhexamethylene adipamide.

Accordingly, it is an object of this invention to produce polyamides which can be formed into fibers suitable for use as tire cord. A further object is to provide linear condensation polymers of terephthalic acid with diaminoalkanes which can readily be melt-spun into useful fibers. Another object is to prepare high modulus polyamide fibers. Another object is to provide a process for preparing novel polyamides. Other objects of the invention will become apparent from the following description and claims.

In accordance with the present invention it has been found that introduction of a methyl side chain into hexamethylenediamine, heptamethylenediamine or octamethylenediamine has the surprising effect of making possible the production of terephthalamide condensation polymers which may be spun by the established methods used for polyhexamethyleneadipamide into strong fibers having desirable textile properties, such as good resistance to shrinkage by boiling water and good ironing properties as shown by zero strength temperatures in excess of 200° C. The monomethyl- and dimethyl-hexamethyleneterephthalamides are especially desirable for such uses as tire cord because they can be spun into fibers having initial tensile moduli of from 90 to 120, or over twice that of polyhexamethyleneadipamide fibers.

In general, the diamines useful for the purposes of this invention are diaminoalkanes having a methyl-substituted hydrocarbon chain 6 to 8 carbon atoms in length and a total number of carbon atoms in the molecule which does not exceed the value obtained by subtracting the number of methyl groups from 10, and with the two amino groups attached to the end carbons of the chain. These limits are critical for the preparation of desirable fibers by any of the usual methods. It has already been pointed out that no way has been found to prepare useful terephthalamide fibers with diaminoalkanes when the amino groups are separated by less than 6 carbon atoms. Straight chain diaminoalkanes of 6 to 10 carbon atoms give polymers melting at such high temperatures that they cannot be melt-spun by ordinary methods and when the diaminoalkane chain is longer than 10 carbon atoms, the physical properties of the resulting fibers are not much different from the known aliphatic polyamides, e. g., polyhexamethyleneadipamide. A special plasticized melt-spinning technique, using a high boiling solvent, as disclosed in Spanagel U. S. Patent No. 2,214,442 is useful in spinning the high melting terephthalamides, but this has undesirable features, as will be disclosed subsequently.

Terephthalamide polymers prepared with diaminoalkanes having a methyl-substituted hydrocarbon chain having a number of carbon atoms in excess of 10 minus the number of methyl groups have zero strength temperatures which are undesirably low for most textile uses, most of them also being water-sensitive and shrinking excessively in hot water. This was true, for example, of terephthalamide polymers prepared with 2,5-dimethylheptamethylenediamine, 5 - methyl - 1,9 - nonanediamine and 3-neopentylheptamethylenediamine, as will be shown subsequently.

The polymers of this invention are linear condensation polymers composed of recurring structural units of the formula

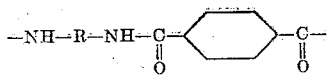

wherein R is a methyl-substituted saturated hydrocarbon chain 6 to 8 carbon atoms in length and has a total number of carbon atoms which does not exceed the value obtained by substracting the number of methyl groups from 10, the NH groups being attached to the end carbons of the chain. Preferred polymers are those wherein R is an alkyl-substituted hexamethylene chain and the alkyl substitution consists of 1 to 2 methyl groups attached to the chain in the 2 to 5 positions; these polymers can readily be formed into strong fibers having exceptionally high initial tensile moduli.

The above polymers may be prepared by the following general procedure: A slight excess of the diaminoalkane is added directly to a slurry of terephthalic acid and an equal weight of water. The mixture is heated to reflux and sufficient water is added to dissolve the diammonium terephthalate salt formed. The solution is treated with activated carbon and hot filtered into a quantity of n-propyl alcohol equal to 10–15 times the weight of the terephthalic acid used. The precipitated salt is recrystallized by dissolving the salt in boiling water and filtering into n-propyl alcohol as before. The salt is polymerized by heating in an autoclave under atmospheric to moderate pressure in the presence of about 1 to 2% excess of terephthalic acid, which functions as a stabilizer. The temperature is raised as the polymerization proceeds to keep the reaction mixture molten, a temperature of the order of 300° C. generally being required during the last part of the polymerization. A high boiling solvent, such as o-hydroxy diphenyl, is preferably included to facilitate keeping the reaction mixture liquid. The polymerization is generally complete in two to three hours. Vacuum may be used near the end of the polymerization to remove the solvent and other non-polymeric materials.

The invention will now be illustrated by the following examples, in which parts are by weight unless otherwise specified. In these examples the inherent viscosity values of the polymers are given as an indication of the degree of polymerization obtained. In view of the relative ease with which these values are determined, they provide a useful method of evaluating the effect of process variables on a given type of polymerization. The values may be misleading when used to compare different types of polyamides but, in general, those having values of at least about 0.3 were spinnable. In determining these values, viscosimeter flow times were obtained at 25.0°±0.1° C. for a solvent of the polyamide and for a solution of the polyamide in the solvent at a concentration of 0.5 grams per 100 cubic centimeters of solution. The inherent viscosity value was then calculated as 2 times the natural logarithm of the relative viscosity of the solution compared to that of the pure solvent. Unless otherwise specified, the solvent was m-cresol.

EXAMPLE 1

2,5-dimethylhexamethylenediamine for use in preparing its terephthalamide may be prepared by hydrogenation of alpha-methylene-delta-methyladiponitrile obtained by dimerization of methacrylonitrile (Howk U. S. 2,309,509). A mixture of 230 parts of alpha-methylene-delta-methyladiponitrile, 2 parts of palladium-on-carbon catalyst and 120 parts of methanol was hydrogenated at 70° C. under 1000 to 2000 pounds per square inch hydrogen pressure for two hours until approximately the theoretical amount of hydrogen had been absorbed. The hydrogenated mixture was filtered, and the filtrate was distilled through a two-foot glass column packed with helices. A 96% yield of 2,5-dimethyladiponitrile was obtained having a boiling point of 150° C. at 11 mm. pressure and a refractive index of 1.4321 at 25° C.

A mixture of 223 parts of the adiponitrile, 28 parts of Raney cobalt catalyst, and 156 parts dioxane was heated under 2000 to 3000 pounds per square inch hydrogen pressure for one hour at 125° C. with absorption of the theoretical amount of hydrogen. The catalyst was removed by filtration, and the filtrate was distilled through a two foot glass column packed with helices. After removal of dioxane, followed by 2,5-dimethylhexamethylene imine, a main cut of 2,5-dimethylhexamethylenediamine was obtained having a boiling point of 112° C. at 20 mm., a refractive index of 1.4581 at 25° C. and a neutralization equivalent of 72.4, the conversion corresponding to 82% yield.

The terephthalic acid salt of the above diamine was prepared by the general procedure described immediately above this example. A mixture of 100 parts of the 2,5-dimethylhexamethylenediammonium terephthalate salt, 0.53 part of terephthalic acid and 50 parts of o-hydroxydiphenyl was heated to 230° C. for 30 minutes at atmospheric pressure, to 285° C. for 70 minutes at atmospheric pressure, and to 317° C. for 15 minutes at 5 mm. pressure. The resulting polymer, which had an inherent viscosity of 0.73 was press spun at 295° C. through a spinneret having 0.007 in. dia. holes. The filaments formed were drawn 4.9 times the as-spun length at 118° C. into strong 9 denier filaments.

The physical properties of the filaments are shown in Table I in comparison with other fibers. Of particular interest for use as tire cord is the exceptionally high initial tensile modulus of 118, as compared with 42 for typical commercial polyhexamethyleneadipamide nylon, and the high zero strength temperature of 285° C. The new fiber also has an inflation growth at room temperature which is less than one-third that of the commercial nylon (polyhexamethyleneadipamide). This is measured by subjecting the fiber to a constant tension which is one-seventh of the breaking load, maintaining this load for a period of 30 minutes at room temperature and measuring the elongation. This was only 0.6%, whereas the polyhexamethyleneadipamide elongated 2.0%.

EXAMPLE 2

2-methylhexamethylenediamine was prepared by hydrogenating methylfuran to produce tetrahydromethylfuran, treating this with hydrochloric acid and sodium cyanide to produce 2-methyladiponitrile, and hydrogenating this with Raney cobalt catalyst. After distillation the resulting 2-methylhexamethylenediamine had a neutralization equivalent of 65.3, a boiling point of 111° C. at 24 mm. and a refractive index of 1.4568 at 25° C.

The salt was prepared by adding 24.9 parts of the diamine to an aqueous slurry of 31 parts terephthalic acid. After proceeding as described previously a salt melting at 267–9° C. was obtained. A mixture of 49 parts of the 2-methylhexamethylenediammonium terephthalate salt, 21 parts of o-hydroxydiphenyl and 1¼% excess terephthalic acid was heated at 220–245° C. for 45 minutes at atmospheric pressure, 285° C. for 60 minutes at atmospheric pressure, 330–335° C. for 20 minutes under vacuum and 330° C. for 5 minutes at atmospheric pressure. The resulting polymer had an inherent viscosity of 0.88 and was spun at 325° C. through 0.007 inch orifices of a spinneret into filaments which were wound up at 80 feet per minute, and then drawn at 105° C. In order to show the effect of different draw ratios, the as-spun filaments were drawn 3.43 times in one run and 4.63 times in another run. The filament properties are shown in Table I.

EXAMPLE 3

3-methylhexamethylenediamine was prepared by hydrogenating p-cresol to form 4-methylcyclohexanol, oxidizing this to Beta-methyladipic acid, condensing with ammonia to form 3-methyladiponitrile and hydrogenating this to the diamine. Distillation through a packed column gave 3-methylhexamethylenediamine with a boiling point of 103° C. at 13 mm., a refractive index of 1.4581 at 25° C. and a neutralization equivalent of 65.2. The terephthalate salt, prepared as described previously, using 27.2 parts of diamine to 34 parts of terephthalic acid, had a melting point of 256–258° C.

A mixture of 60 parts of the 3-methylhexamethylenediammonium terephthalate salt, 30 parts of o-hydroxydiphenyl and 1½% excess terephthalic acid was heated to 205–230° C. for 30 minutes, 230 to 270° C. for 15 minutes, 270 to 285° C. for 105 minutes, and 285–321° C. for 15 minutes all at atmospheric pressure, then 320–305° C. for 35 minutes under vacuum and 305° C. for 5 minutes at atmospheric pressure. The resulting polymer had an inherent viscosity of 0.89 and was spun at 304° C. through 0.007 inch orifices of a spinneret into filaments which were then drawn 3.48× at 105° C. or 4.8× at 140° C. in different runs. The filament properties are shown in Table I.

EXAMPLE 4

3-methylheptamethylenediamine was prepared by reacting isobutene with acrylonitrile to produce 5-methyl-5-hexenenitrile, reacting this with carbon monoxide and hydrogen to form 6-formyl-5-methylhexanenitrile and treating this with ammonia and hydrogen to give the diamine. Distillation gave a constant boiling fraction having a boiling point of 120° C. at 19 mm., a refractive index of 1.4599 at 25° C. and a neutralization equivalent of 71.9. The terephthalate salt was prepared with 85 parts of diamine and 96 parts of terephthalic acid.

A mixture of 110 parts of the above 3-methylheptamethylene diammonium terephthalate salt, 50 parts of o-hydroxydiphenyl and 0.8% excess of terephthalic acid was heated to 210–268° C. for 50 minutes at atmospheric pressure, to 268–290° C. for 75 minutes at atmospheric pressure, and to 290–277° C. for 30 minutes under vacuum. The resulting polymer had an inherent viscosity of 0.88 and was spun at 285° C. through 0.007 inch orifices of a spinneret into filaments which were wound up at 80 feet per minute and then drawn 3.5× at 110° C. The fiber properties are shown in Table I. The initial modulus of 41 and 50% strength temperature of 150° C. are too low for tire cord uses, but the fiber is wool-like in properties and has desirable elongation recovery properties. The tensile recovery from 3 to 5% elongations was 98 and 95%, respectively, and the corresponding work recovery values were 79 and 69%. The fiber was elongated at a rate of 10% per minute and allowed to recover at the same rate in determining these values.

EXAMPLE 5

4-methyloctamethylenediamine was prepared from dimethyl (beta-methyl) adipate. The adipate was hydrogenated, using copper-chromium-barium catalyst, at 280–285° C. and 3000 pounds per square inch pressure. Distillation of the reaction products gave a 47% yield of constant boiling 3-methylhexanediol-1, 6 having a boiling point of 128° C. at 415 mm. and a refractive index of 1.4535 at 25° C. This glycol was saturated with anhydrous hydrogen bromide at 100° C. and the crude reaction product was washed with sulfuric acid, and neutralized to pH 8 with ammonium hydroxide, washed twice with 50% methanol solution, dried and distilled. A 75% yield of 1,6-dibromo-3-methylhexane boiling at 114° C. at 8 mm. was obtained and 158 parts was added dropwise with stirring over about one hour to a refluxing solution of 98 parts sodium cyanide in 220 parts of 70% aqueous ethanol. Refluxing was continued for 22 hours. The reaction product was filtered and distilled to give a 69% yield of alpha-methylsuberonitrile boiling at 141° C. under 1.5 mm. pressure. Hydrogenation of this dinitrile gave a 71% yield of 4-methyloctamethylenediamine boiling at 111° C. at 6 mm. and having a neutralization equivalent of 79.2. The terephthalate salt formed from 24.9 parts of diamine and 25.4 parts of terephthalic acid had a melting point in excess of 230° C.

A mixture of 50 parts of the 4-methyloctamethylene diammonium terephthalate salt, 25 parts of o-hydroxydiphenyl and 1% excess terephthalic acid was heated to 205–242° C. for 115 minutes at atmospheric pressure, to 242–278° C. for 65 minutes at atmospheric pressure, and to 278–265° C. for 35 minutes under vacuum. The resulting polymer had an inherent viscosity of 0.93 and was spun at 275° C. through 0.007 inch orifices of a spinneret into filaments which were wound up at 80 feet per minute and then drawn 4.0× at 110° C. The properties of the fiber are shown in Table I.

Additional diaminoalkanes which can be used in place of those illustrated in the examples for preparing terephthalamide polymers and fibers in accordance with this invention include the 2,2-, 3,3-, 2,3-, and 2,4-dimethylhexamethylenediamines, the 2- and 4-methylheptamethylenediamines, and the 2- and 3-methyloctamethylenediamines. These may be prepared by methods analogous to those illustrated.

It is possible and sometimes desirable to prepare the polyamides of this invention by an interphase polymerization procedure which brings together for reaction at about room temperature an organic diamine and an organic dicarboxylic acid halide initially existing in separate substantially immiscible liquid phases at least one of which contains a diluent. This procedure is particularly well adapted to the production of those polyamides which require high temperatures for their preparation by the techniques heretofore commonly employed and which suffer appreciable decomposition and degradation at these high temperatures of either the polymer itself or the reacting ingredients. Copolyamides would, of course, result from using more than one diamine, more than one dicarboxylic acid halide or both.

The following additional examples of the preparation of terephthalamide polymers and fibers, using homologs of the class of diaminoalkanes illustrated in Examples 1 to 5 and above, have been included to show that departing even slightly from the above class causes serious difficulties in preparing useful polymers and fibers in some cases, and fibers produced in other cases have much less desirable properties.

EXAMPLE 6

Heptamethylenediammonium terephthalate salt was prepared by the general methods already illustrated. A mixture of 50 parts of the salt, 50 parts of o-hydroxydiphenyl and 2% excess terephthalic acid was heated to 210–305° C. for 35 minutes, 305° C. for 75 minutes and 305–355° C. for 10 minutes at atmospheric pressure, then 355–340° C. for 30 minutes under vacuum and 340° C. for 5 minutes at atmospheric pressure. A light yellow opaque polymer was obtained which softened at 315° C. The polymer was press-spun at 340° C. through 0.007 inch orifices of a spinneret and wound up at 80 feet per minute. The filaments contained many bubbles, because of the high spinning temperature required to melt the polymer, and had negligible strength.

Repeated attempts to improve the polymer by varying the polymerization conditions were unsuccessful. Usually the polymer was not homogeneous because part of the mixture solidified during the polymerization and could not be remelted. Trouble with foaming during polymerization was also experienced. Attempts to polymerize hexamethylenediammonium terephthalate by the methods described were even less successful, a brittle polymer which could not be spun resulted. Satisfactory fibers have only been produced by both polymerization and spinning in the presence of a plasticizer, followed by extraction of the plasticizer, using the methods described in Examples 7 and 8.

EXAMPLE 7

Decamethylenediammonium terephthalate salt having a melting point of 285–290° C. was prepared by the general methods described. Eighty parts of the salt was ground in a mixing vessel with a plasticizer mixture of 20 parts of 4,4'-dihydroxydiphenyl and 10 parts of 2-hydroxydiphenyl. The white powder was placed in an aluminum liner and this was placed in an autoclave. The autoclave was alternately evacuated and filled with nitrogen three times and then heated with boiling dimethylphthalate at 282° C. for 4 hours. The pressure reached 5–10 pounds per square inch. After cooling to room temperature the plasticized polymer plug was removed by tearing the liner apart. The plasticized polymer was spun into filaments at 272° C. and drawn 4.5× at 150° C. to form 11 denier filaments having a tenacity of 3.1 grams per denier and an initial modulus of 65.

Plasticizer removal was accomplished by Soxhlet extraction for 2–3 hours with boiling alcohol, the filaments being treated slack in skein form. No difference in physical properties was obtained by longer extraction. The treatment reduced the denier to 8 and the initial modulus to 43, but the tenacity was substantially unaffected. The reduction of the initial modulus of the fibers may be as great as 50% of the as-drawn material. The fibers cannot be drawn after plasticizer is removed. Properties are summarized in Table I.

In the absence of plasticizer the spinning temperature is 385° C. or higher. The plasticizer reduced this temperature by over 100° C. However, incorporation of plasticizer into the preformed polymer is not satisfactory. The plasticizer also has the important functions during polymerization of lowering the melting point, binding the water of polymerization, increasing the rate of polymerization and increasing the molecular weight of the polymer obtained. Hence severe limitations are placed upon a plasticizer candidate, since it must fit into the whole process. A plasticizer should have a melting point below 275° C., a boiling point higher than 300° C., and be non-reactive with the polymer and stable at 300° C. Practical considerations make hydroxylated diphenyls satisfactory plasticizers.

EXAMPLE 8

By a procedure similar to that of Example 7, a mixture of 80 parts of hexamethylenediammonium terephthalate salt, 20 parts of 4,4'-dihydroxydiphenyl and 20 parts of 3,3'-dimethyl-4,4'-dihydroxydiphenyl were heated for 5 hours at 285° C. under autogeneous pressure and then for 1.5 hours at 285° C. under vacuum. The polymer was spun at 362° C. into filaments which were drawn 4.0× at 250° C. to 23 denier. After extraction with alcohol the properties were as shown in Table I.

Loss of plasticizer by sublimation during polymerization was a major difficulty. Compositions which show complete retention in the preparation of polydecamethylene terephthalamide give large losses in the preparation of polyhexamethylene terephthalamide. As a result well-plasticized polymer was not obtained and high spinning temperatures had to be used. The use of vacuum increased plasticizer loss, but without vacuum only weak, brittle fibers were obtained.

EXAMPLE 9

3-neopenthylheptamethylenediamine was prepared by reaction of diisobutylene with acrylonitrile to form 5-neopentyl-5-hexenenitrile, conversion to 3-neopentyl-heptamethylenedinitrile with carbon monoxide and hydrogen, followed by reduction to the diamine with hydrogen. The diamine had a boiling point of 103° C. at 1.5 mm., a refractive index of 1.4609 at 25° C. and a neutralization equivalent of 100.7. A mixture of 135 parts of 3-neopentylheptamethylenediammonium terephthalate salt, 70 parts of water and 1% excess terephthalic acid was heated to 260° C. for 120 minutes with the pressure rising to 250 pounds per square inch, heated for 20 minutes at 260° C. and atmospheric pressure, and heated at 260–252° C. for 90 minutes under vacuum. The resulting polymer had an inherent viscosity of 0.65 and was spun at 275° C. through 0.007 inch orifices of a spinneret and drawn 4.85× at 105° C. The fiber properties are shown in Table I. The high shrinkage of 65% and low zero strength temperature of 170° C. were undesirable.

EXAMPLE 10

2,5-dimethylheptamethylenediamine was prepared from 2,5-dimethyl-5-hexenenitrile by a carbonylation reaction similar to that described in Example 4 for the preparation of 3-methylheptamethylenediamine. The dimethylhexenenitrile was prepared by thermal addition of isobutylene to methacrylonitrile. The diamine had a boiling point of 101° C. at 4 mm., a refractive index of 1.4589 at 25° C. and a neutralization equivalent of 82. The terephthalate salt, prepared by the method described, had a melting point of 273–4° C. A mixture of 50 parts of the 2,5-dimethylheptamethylenediammonium terephthalate salt and 25 parts of o-hydroxydiphenyl were heated to 220–290° C. for 50 minutes and at 230° C. for 70 minutes at atmospheric pressure, at 250–230° C. for 70 minutes under vacuum, and at 230° C. for 5 minutes at atmospheric pressure. The polymer had an intrinsic viscosity of 0.67 and was spun at 248° C. through 0.007 inch spinneret orifices into filaments which were drawn 3.3× at 105° C. The properties of the fibers are shown in Table I. The high water sensitivity, indicated by the shrinkage of 76%, and the extremely low zero strength temperature of 125° C. are most undesirable in a textile fiber.

EXAMPLE 11

The terephthalamide polymer of 5-methyl-1,9-nonanediamine was prepared by methods analogous to those disclosed in Example 4 for the preparation of 3-methylheptamethylenediamine and its terephthalamide polymer. The properties of fibers spun from the polymer are shown in Table I. The fiber was highly sensitive to water, shrinking 78%, and had a low zero strength temperature of 160° C.

EXAMPLE 12

3-methylpentamethylenediamine, having a boiling point of 97° C. at 27 mm., a refractive index of 1.4569 at 25° C., and a neutralization equivalent of 58.2, was converted to the terephthalate salt and polymerized by the methods disclosed in the previous examples. Eight attempted preparations failed to give useful polymers. Short cycles at high temperatures led to discoloration and decomposition, while longer cycles at low temperatures gave low molecular weight polymer. Spinnable polymers were obtained but the fibers were weak and brittle. Failure to attain high molecular weight polymer probably was due to cyclization of the diamine.

Table I
PHYSICAL PROPERTIES OF FIBERS

| Ex. | Polymer [1] | Fiber Drawn | Init. Modulus | Tenacity, gm./den. | Shrinkage (5 min. boil) | Temp. to Reduce to— | |
|---|---|---|---|---|---|---|---|
| | | | | | | Zero Strength | 50% Str. |
| | | | | | Percent | °C. | °C. |
| 1 | 2,5-DiMe6–T | 4.9× | 118 | 4.7 | 6 | 285 | 200 |
| 2a | 2-Me6–T | 3.43× | 83 | 3.3 | 7 | 298 | 275 |
| 2b | 2-Me6–T | 4.63× | 100 | 4.6 | 12 | | |
| 3a | 3-Me6–T | 3.48× | 66 | 2.7 | 8 | 259 | 250 |
| 3b | 3-Me6–T | 4.8× | 95 | 4.1 | | | |
| 4 | 3-Me7–T | 3.5× | 41 | 3.7 | 11 | 220 | 150 |
| 5 | 4-Me8–T | 4.0× | 66 | 4.8 | 14 | 245 | 200 |
| 6 | 7–T | (²) | | | | | |
| 7 | 10–T | 4.5× | 43 | 3.4 | | 295 | |
| 8 | 6–T | 4.0× | 80 | 2.0 | | | |
| 9 | NP7–T | 4.85× | 46 | 2.4 | 65 | 170 | 130 |
| 10 | 2,5-DiMe7–T | 3.3× | 35 | 1.3 | 76 | 125 | 115 |
| 11 | 5-Me9–T | 2.4× | 40 | 1.9 | 78 | 160 | 150 |
| 12 | 3-Me5–T | (³) | | | | | |

[1] For name of polymer represented by the abbreviation see example referenced.
[2] Filaments contained bubbles and could not be drawn.
[3] Weak, brittle fibers that would not draw.

The above table shows the unexpected superiority of the fibers of Examples 1 to 5 over fibers prepared from branched-chain diamines falling outside the class of this invention. The seemingly closely related fibers of Examples 9, 10, and 11 were exceedingly sensitive to water, as indicated by shrinkage in boiling water, an accelerated test. The polymer of Example 12, prepared from a diamine having only 5 carbon atoms in the carbon chain connecting the nitrogen atoms, provided only weak, brittle fibers. Examples 6, 7 and 8 show the great difficulties encountered in preparing and spinning polymers from straight chain diamines.

Fibers prepared from the polymers of this invention are all useful for textile purposes. The table shows that the preferred class of polymers prepared with methyl-substituted hexamethylenediamines are also capable of being formed into fibers having unusually high moduli desirable for tire cord.

As many different embodiments of the present invention may be made without departing from the spirit and scope thereof, it is to be understood that the invention is not limited to the specific embodiments disclosed except to the extent defined in the appended claims.

What is claimed is:
1. A linear terephthalamide polymer composed of recurring structural units of the formula

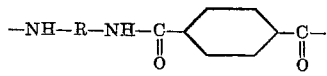

wherein R is a methyl-substituted saturated hydrocarbon chain 6 to 8 carbon atoms in length in which the methyl substitution consists of 1 to 2 methyl groups attached to the hydrocarbon chain in the 2 to 5 positions and R has a total number of carbon atoms which does not exceed the value obtained by subtracting the number of methyl groups from 10, the NH groups being attached to the end carbons of the chain.

2. The polymer of claim 1 wherein R is a saturated hydrocarbon chain 6 carbon atoms in length, methyl substituted in the 2 to 5 positions by no more than 2 methyl groups.

3. The polymer of claim 1 wherein R is 2-methylhexamethylene.

4. The polymer of claim 1 wherein R is 3-methylhexamethylene.

5. The polymer of claim 1 wherein R is 2,5-dimethylhexamethylene.

6. The polymer of claim 1 wherein R is 3-methylheptamethylene.

7. The polymer of claim 1 wherein R is 4-methyloctamethylene.

8. A fiber of the polymer of claim 2 characterized by a tensible strength in excess of 4 grams per denier, retention of at least 50% of its strength at temperatures up to 200° C. and an initial modulus of over 90.

9. A fiber of the polymer of claim 3.
10. A fiber of the polymer of claim 4.
11. A fiber of the polymer of claim 5.
12. A fiber of the polymer of claim 6.
13. A fiber of the polymer of claim 7.

References Cited in the file of this patent
UNITED STATES PATENTS

| | | |
|---|---|---|
| 2,252,555 | Carothers | Aug. 12, 1941 |
| 2,396,248 | Christ | Mar. 12, 1946 |
| 2,628,216 | Magat | Feb. 10, 1953 |
| 2,640,082 | Schreyer | May 26, 1953 |

OTHER REFERENCES

Hill et al.: Journ. Polymer Scie., vol. 3, October 1948, pages 609, 618, 619, 620.

Hill et al.: Journ. Polymer Scie., vol. 3, October 1948, page 616.